United States Patent
Toyama et al.

(10) Patent No.: US 7,884,374 B2
(45) Date of Patent: *Feb. 8, 2011

(54) LED BACKLIGHT DEVICE AND LCD DEVICE

(75) Inventors: Hiroshi Toyama, Hachioji (JP); Yukio Nakamura, Hachioji (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/038,827

(22) Filed: Feb. 28, 2008

(65) Prior Publication Data

US 2008/0211993 A1    Sep. 4, 2008

(30) Foreign Application Priority Data

Mar. 1, 2007    (JP) ............................. 2007-051710

(51) Int. Cl.
    *H01L 33/00* (2010.01)
(52) U.S. Cl. .......................... 257/79; 257/72; 257/59; 257/E51.018; 349/69
(58) Field of Classification Search .................. 257/52, 257/59, 72, 79–82, 98, 101, 103, E51.018; 349/69; 315/169.3; 362/97.3, 612–613
    See application file for complete search history.

(56) References Cited

U.S. PATENT DOCUMENTS

| | | | |
|---|---|---|---|
| 5,813,753 A | 9/1998 | Vriens et al. | |
| 7,006,172 B2 | 2/2006 | Kawana et al. | |
| 7,481,563 B2 * | 1/2009 | David et al. | 362/612 |
| 2003/0026096 A1 | 2/2003 | Ellens et al. | |
| 2004/0021629 A1 | 2/2004 | Sasuga et al. | |
| 2006/0158581 A1 | 7/2006 | Komoto et al. | |

(Continued)

FOREIGN PATENT DOCUMENTS

EP    1 385 215 A2    1/2004

(Continued)

OTHER PUBLICATIONS

Akihiki Murai et al., "Hexagonal pyramid shaped light-emitting diodes based on ZnO and GaN direct wafer bonding", Applied Physics Letters, vol. 89, No. 17, pp. 171116-1-171116-3, (2006).

(Continued)

*Primary Examiner*—Davienne Monbleau
*Assistant Examiner*—Hoa B Trinh
(74) *Attorney, Agent, or Firm*—Panitch Schwarze Belisario & Nadel LLP (57) ABSTRACT

An LED backlight device includes a substrate having an optical transparency and an LED thin-film layered structure fixed to a first surface of the substrate. The LED thin-film layered structure is formed of epitaxially grown inorganic material layers as a P-N junction device. An anode electrode and a cathode electrode are formed on the LED thin-film layered structure. An anode driver IC and a cathode driver IC are provided for driving the LED thin-film layered structure. A wiring structure electrically connects the anode driver IC and the anode electrode of the LED thin-film layered structure and electrically connects the cathode driver IC and the cathode electrode of the LED thin-film layered structure. A phosphor is formed on the second surface of the substrate opposite to the first surface.

12 Claims, 8 Drawing Sheets

U.S. PATENT DOCUMENTS

| | | |
|---|---|---|
| 2007/0080626 A1 | 4/2007 | Son et al. |
| 2008/0218662 A1 | 9/2008 | Toyama et al. |

FOREIGN PATENT DOCUMENTS

| | | |
|---|---|---|
| EP | 1 521 235 A2 | 4/2005 |
| JP | 9232198 A | 9/1997 |
| JP | 11-23290 A | 8/1999 |
| JP | 2000133006 A | 5/2000 |
| JP | 2003068109 A | 3/2003 |
| JP | 2004119634 A | 4/2004 |
| JP | 2005051117 A | 2/2005 |
| JP | 2005079369 A | 3/2005 |
| JP | 2005093649 A | 4/2005 |
| JP | 2005150703 A | 6/2005 |
| JP | 2006244779 A | 9/2006 |
| JP | 2006261218 A | 9/2006 |
| JP | 2006308858 A | 11/2006 |
| WO | 97/48138 A2 | 12/1997 |
| WO | 2006076210 A2 | 7/2006 |

OTHER PUBLICATIONS

Po-Chun Liu et al., "Wafer bonding for high-brightness light-emitting diodes via indium tin oxide intermediate layers", Thin Solid Films, vol. 478, No. 1-2, pp. 280-285, (2005).

* cited by examiner

LED BACKLIGHT DEVICE AND LCD DEVICE

BACKGROUND OF THE INVENTION

This invention relates to an LED backlight device and an LCD device using the LED backlight device.

In a general LCD (Liquid Crystal Display) device, a light is emitted by a light source, and is incident on an LCD panel. The LCD device is configured to change molecular alignments of liquid crystals (pixels) arranged on the LCD panel, so as to display an image using the light passing through the LCD panel.

The light source used in such an LCD device is called as a backlight, since the light source is disposed on the backside of the LCD panel (i.e., the side opposite to a display surface of the LCD panel). The conventional light source is composed of a cold cathode ray tube or a semiconductor light emitting element. The light source using the semiconductor light emitting element has been broadly used, since such a light source has a long lifetime and contributes to reduction of power consumption.

In this regard, there is known a surface-emitting light source that uses an LED (Light Emitting Diode) as the above described semiconductor light emitting element. Such a surface-emitting light source has a plate-like member called as a light guiding plate or a light diffusion plate for guiding the light emitted by the LED. The light emitted by the LED is incident on an end surface of the light guiding plate. The light guiding plate reflects and diffuses the incident light in the direction perpendicular to the surface of the light guiding plate, and emits the light from a surface thereof (see Patent Document No. 1).

Patent Document No. 1: Japanese Laid-Open Patent Publication No. 11-232920.

However, in the conventional backlight device, the light diffused in the interior of the light guiding plate tends to attenuate due to the reflection and diffusion, as a distance from the incident surface (i.e., the end surface of the light guiding plate) increases. Therefore, in order to obtain a high light intensity uniformly over the entire surface, the structure of the light guiding plate needs to be complicated, and the LED backlight device needs to be thick.

SUMMARY OF THE INVENTION

The present invention is intended to solve the above described problems, and an object of the present invention is to provide a thin LED backlight device capable of providing a high light intensity, and an LCD device using such an LED backlight.

The present invention provides a backlight device including a substrate having an optical transparency and having a first surface and a second surface opposite to the first surface, an LED thin-film layered structure formed on the first surface of the substrate, the LED thin-film layered structure being formed of epitaxially grown inorganic material layers as a P-N junction device, an anode electrode and a cathode electrode formed on the LED thin-film layered structure, an anode driver IC and a cathode driver IC for driving the LED thin-film layered structure, a wiring structure that electrically connects the anode driver IC and the anode electrode of the LED thin-film layered structure and electrically connects the cathode driver IC and the cathode electrode of the LED thin-film layered structure, and a phosphor formed on the second surface of the substrate.

Since the LED backlight device has the phosphor formed on the second surface of the substrate (having an optical transparency) opposite to the first surface on which the LED thin-film layered structure is formed, it becomes possible to obtain a thin LED backlight device providing a high light intensity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, an embodiment of the present invention will be described with reference to the attached drawings.

First Embodiment

Figure 1:
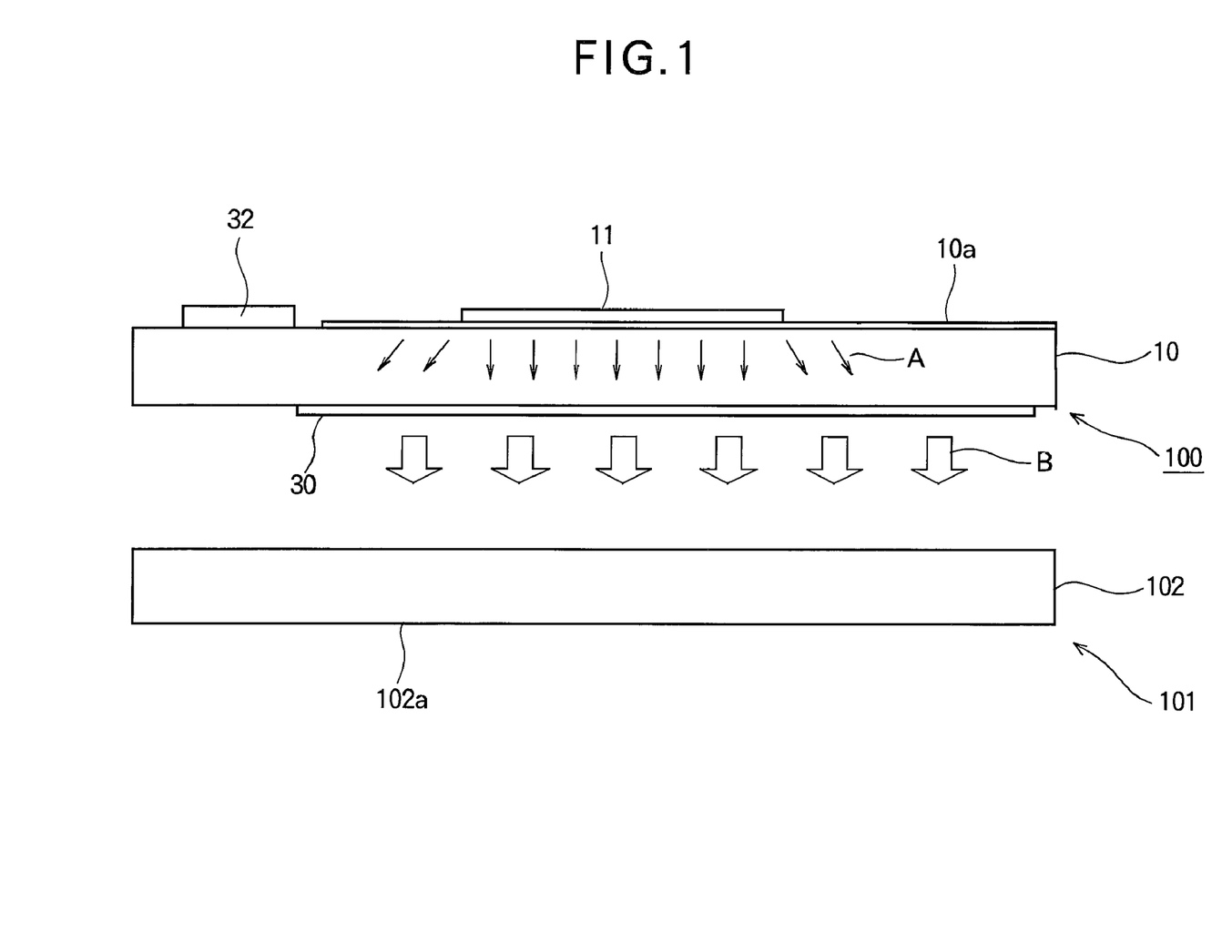
FIG. 1 is a side sectional view showing a main part of an LCD device including an LED backlight device according to the first embodiment of the present invention.
Figure 2:
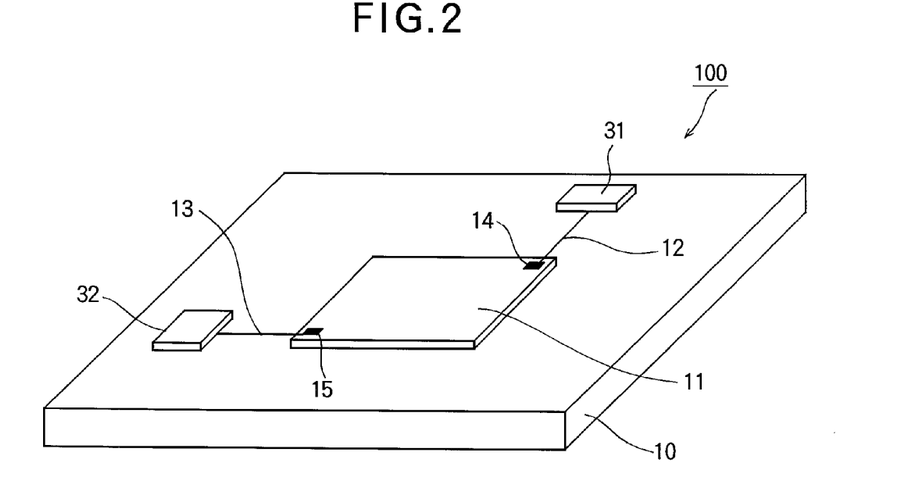
FIG. 2 is a perspective view showing the LED backlight device according to the first embodiment of the present invention, as seen from a first surface side.
Figure 3:
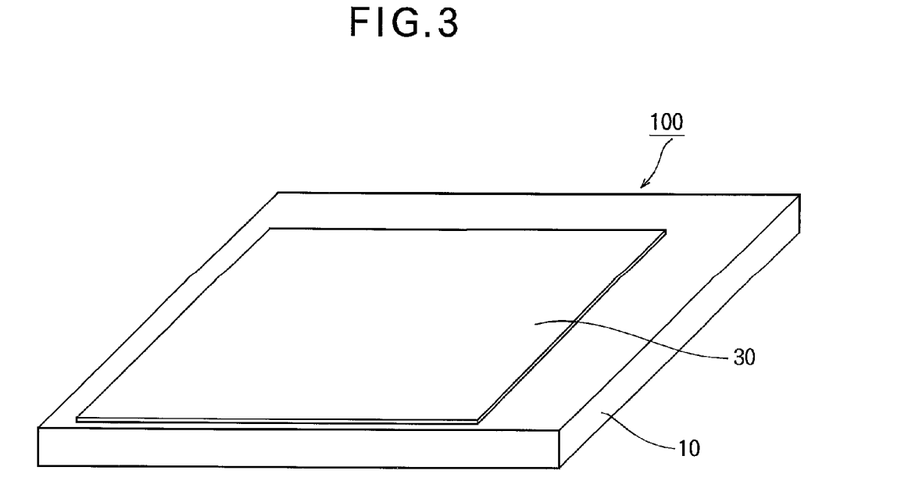
FIG. 3 is a perspective view showing the LED backlight device according to the first embodiment of the present invention, as seen from a second surface side.

FIG. 1 is a side sectional view showing a main part of an LCD device including an LED backlight device according to the first embodiment of the present invention. FIG. 2 is a perspective view showing the LED backlight device according to the first embodiment of the present invention, as seen from a first surface side. FIG. 3 is a perspective view showing the LED backlight device according to the first embodiment of the present invention, as seen from a second surface side.

In FIG. 1, an LED backlight device 100 according to the first embodiment is used as a light source in a LCD device 101, and is disposed on a backside of an LCD panel 102 (i.e., the side opposite to a display surface 102a of the LCD panel 102). The LCD panel 102 is of a transmission type.

The LED backlight device 100 includes a substrate 10 in the form of a flat plate. The LED backlight device 100 further includes an LED 11 (i.e., an LED thin-film layered structure) fixed to a first surface of the substrate 10 (i.e., an upper surface in FIG. 1), and a phosphor 30 fixed to a second surface of the substrate 10 (i.e., a lower surface of in FIG. 1). As shown in FIG. 2, an anode driver IC 31 and a cathode driver IC 32 for driving the LED 11 are disposed on the first surface of the substrate 10. The anode driver IC 31 is connected to an end of an anode wiring 12 (formed on the first surface of the substrate 10) connected to an anode electrode 14 of the LED 11. The cathode driver IC 32 is connected to an end of a cathode wiring 13 (formed on the first surface of the substrate 10) connected to a cathode electrode 15 of the LED 11. The anode wiring 12 and the cathode wiring 13 constitute a wiring structure for electrically connecting the anode driver IC 31 to the LED 11, and for electrically connecting the cathode driver IC 32 to the LED 11.

In FIG. 1 the substrate 10 is formed of a plate having an optical transparency composed of a quarts or glass. The phosphor 30 emits white light when exposed to near-ultraviolet or ultraviolet rays. The phosphor 30 is coated on the second surface of the substrate 10.

The phosphor 30 can be formed by mixing a phosphor that emits red light, a phosphor that emits green light and a phosphor that emits blue light. To be more specific, the phosphor that emits red light is, for example, $Y_2O_3$:Eu or (Y, Gd)$BO_3$:Eu. The phosphor that emits green light is, for example, $LaPO_4$:Ce, Tb or $Zn_2SiO$:Mn. The phosphor that emits blue light is, for example, (Sr, Ca, Ba, Mg)$_5$(PO$_4$)$_3$Cl:Eu or $BaMgAl_{10}O_{17}$:Eu.

The phosphor that emits red light is not limited the above described material, but can be composed of any kind of material that emits light having the wavelength ranging from 620 nm to 710 nm when exposed to near-ultraviolet or ultraviolet rays having the wavelength ranging from 300 nm to 450 nm. The phosphor that emits green light can be composed of any kind of material that emits light having the wavelength ranging from 500 nm to 580 nm when exposed to near-ultraviolet or ultraviolet rays having the wavelength ranging from 300 nm to 450 nm. The phosphor that emits blue light can be composed of any kind of material that emits light having the wavelength ranging from 450 nm to 500 nm when exposed to near-ultraviolet or ultraviolet rays having the wavelength ranging from 300 nm to 450 nm.

The first surface of the substrate 10 is composed of a surface layer 10a (FIG. 1) having an optical transparency formed of an organic insulation film (such as polyimide film or the like) or an inorganic insulation film formed thereon. The surface layer 10a is planarized to a surface accuracy less than or equal to several tens of nanometers, and has no convex or concaves. The LED 11 is peeled off from another substrate (i.e., a base material) as described later, and is fixed to the substrate 10 by means of intermolecular force such as hydrogen bonding, so that the LED 11 is integrated with the substrate 10.

The above described LED 11 is a thin-film LED that emits near-ultraviolet rays or ultraviolet rays, and is composed of a thin-film layered structure having a heterostructure or a double-heterostructure formed by epitaxially growing inorganic material such as gallium nitride, gallium indium nitride, aluminum gallium nitride, aluminum nitride or the like. The LED 11 is not limited to the above described material, but can be composed of any kind of material that emits near-ultraviolet rays or ultraviolet rays, more preferably, the light having the wavelength ranging from 300 to 450 nm.

The LED 11 and the phosphor 30 are respectively formed on the first and second surfaces of the substrate 10 so that the LED 11 and the phosphor 30 face each other. With such an arrangement, when the LED 11 emits near-ultraviolet rays or ultraviolet rays having the wavelength ranging from 300 to 450 nm as shown by arrows A in FIG. 1, the phosphor 30 (facing the LED 11) emits white light as shown by arrows B in FIG. 1.

The anode electrode 14 and the cathode electrode 15 are metal electrodes composed of gold, aluminum, or layered metal electrodes composed of gold or aluminum layered with nickel, titan or the like. The anode electrode 14 and the cathode electrode 15 are respectively connected to an anode and a cathode of the LED 11.

The anode wiring 12 and the cathode wiring 13 are metal wirings composed of gold, aluminum, or layered metal wirings composed of gold or aluminum layered with nickel, titan or the like. The anode wiring 12 and the cathode wiring 13 are respectively connected to the anode electrode 14 and the cathode electrode 15 of the LED 11. An end of the anode wiring 12 is connected the anode driver IC 31, and an end of the cathode wiring 13 is connected the cathode driver IC 32, so that the anode electrode 14 and the cathode electrode 15 of the LED 11 are connected to the anode driver IC 31 and the cathode driver IC 32 via the anode wiring 12 and the cathode wiring 13.

The anode driver IC 31 has a function to supply electric current to the LED 11 according to a lighting signal. In the anode driver IC 31, for example, a shift register circuit, a latch circuit, a constant current circuit, an amplifier circuit and the like are integrated. The anode wiring 12 is connected to the anode electrode 14 of the LED and is also connected to a driving element of the anode driver IC 31. Although the anode driver IC 31 is mounted on the substrate 10 in the example shown in FIG. 2, the anode driver IC 31 is not necessarily provided on the substrate 10, but can be provided on other print circuit board (not shown) or the like.

The cathode driver IC 32 has a function to allow the electric current to flow therein. In the cathode driver IC 32, switching circuits such as transistor or the like are integrated. The cathode wiring 13 is connected to the cathode electrode 15 of the LED 11 and is also connected to the cathode driver IC 32. The cathode driver IC 32 is not necessarily provided on the substrate 10, but can be provided on other print circuit board (not shown) or the like.

Next, a process for forming the LED 11 will be described.

Figure 4:
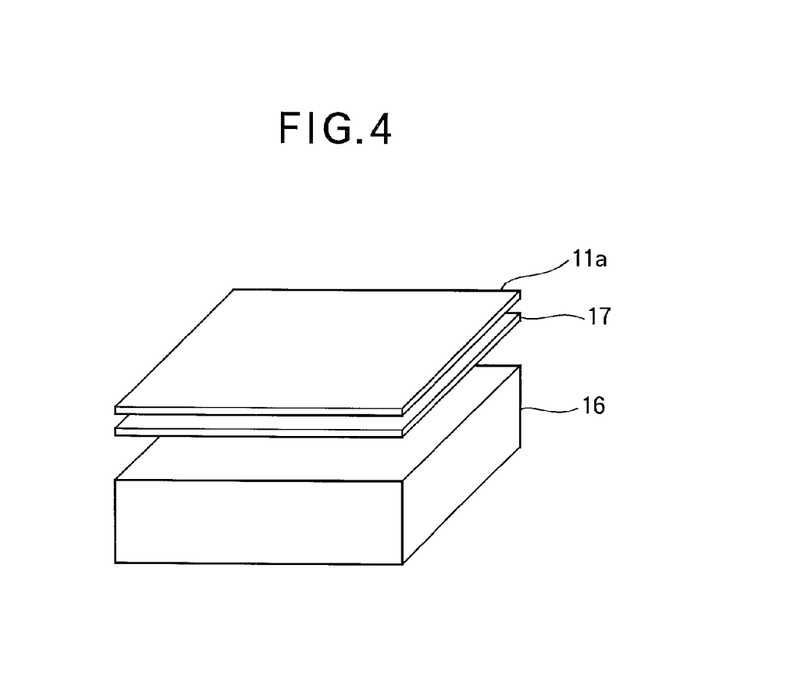
FIG. 4 is a schematic view showing a process for peeling an LED thin-film layered structure according to the first embodiment of the present invention.
Figure 5:
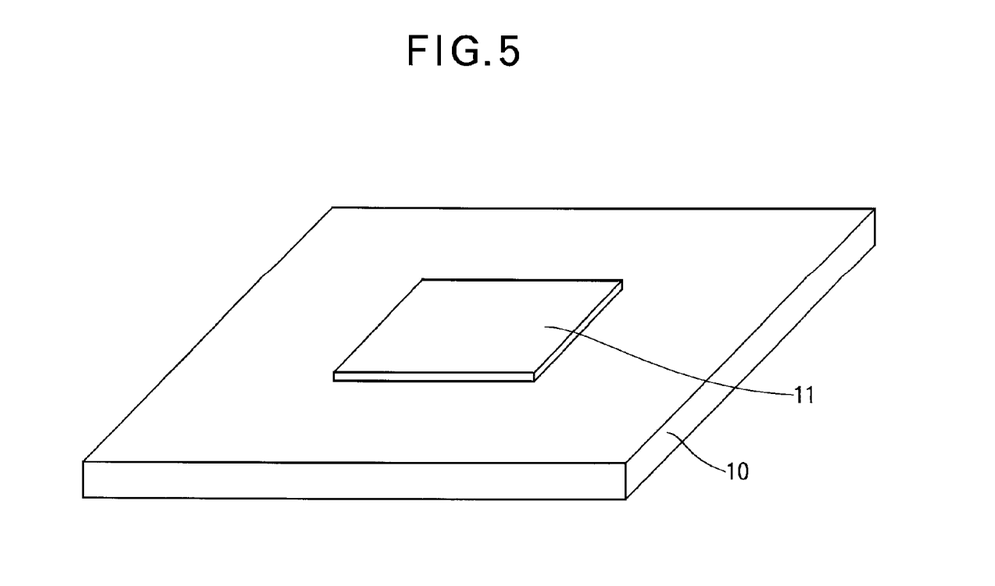
FIG. 5 is a schematic view showing a process for fixing the LED thin-film layered structure to a substrate according to the first embodiment of the present invention.

FIG. 4 shows a process for peeling a thin-film layered structure (the LED 11) according to the first embodiment of the present invention. FIG. 5 shows a process for fixing the thin-film layered structure (the LED 11) to the substrate according to the first embodiment of the present invention.

In the first embodiment, the LED 11 is made of a thin-film layered structure in the form of a rectangular flat plate, and is integrally fixed to the substrate 10 as described later. Further, the LED 11 is a thin-film layered structure that emits near-ultraviolet rays or ultraviolet rays, and has heterostructure or double-heterostructure composed of a plurality of layers such as gallium nitride or indium gallium nitride, aluminum gallium nitride, aluminum nitride or the like.

A sacrificial layer 17 is provided between a base material 16 and the LED 11 for peeling (i.e., separating) the LED 11 from the base material 16. The sacrificial layer 17 is composed of material such as, for example, aluminum arsenide that can easily be etched by an etching solution described later.

The base material 16 is composed of, for example, gallium arsenide, gallium nitride, sapphire or the like. A thin-film layered structure 11a of inorganic material layers (that becomes the LED 11) is epitaxially grown on the base material 16 using a vapor-phase growth method such as an MOCVD method.

Next, a process for peeling the LED 11 (i.e., an epitaxially grown thin-film layered structure 11a) from the base material 16 will be described.

If the LED 11 is designed to have, for example, a square shape having each side of 20 mm in length, the thin-film layered structure 11a is formed to have a width and a length greater than or equal to 20 mm. In this case, the thin-film layered structure 11a is formed in a rectangular shape on the base material 16 using an etching solution such as a solution containing phosphoric acid, hydrogen peroxide and water ($H_3PO_4:H_2O_2:H_2O$) or the like, by means of photolithographic etching technique broadly used in a semiconductor manufacturing process.

Next, the base material 16 on which the thin-film layered structure 11a is formed is immersed in an etching solution such as hydrogen fluoride solution, hydrochloric solution or the like. With this, the sacrificial surface 17 is etched, and the thin-film layered structure 11a (i.e., the LED 11) is peeled off from the base material 16.

Then, the LED 11 (having been peeled off from the base material 16) is pressed against the planarized first surface of the substrate 10, and the substrate 10 and the LED 11 are fixed to each other by means of intermolecular force and integrated with each other.

The surface of the substrate 10 is composed of the surface layer 10a formed of an organic insulation film such as polyimide film or an inorganic insulation film such as silicon oxide firm, and preferably is a flat surface whose surface accuracy is less than or equal to several tens of nanometers having no concaves or convexes. Since the surface of the substrate 10 is such a flat surface having no concave or convex, the bonding between the LED 11 and the substrate 10 by means of intermolecular force (such as hydrogen bonding or the like) can be facilitated. With this, as shown in FIG. 5, the square shaped LED 11 is fixed to and integrated with the substrate 10.

Subsequently, connecting portions of the anode electrode 14 and the cathode electrode 15 are formed on the LED 11 (having been fixed to the substrate 10) using, for example, a photolithographic etching method by means of an etching solution containing phosphoric acid and hydrogen peroxide and water ($H_3PO_4:H_2O_2:H_2O$). Further, the anode electrode 14 and the cathode electrode 15, and the anode wiring 12 (connected to the anode electrode 14) and the cathode wiring 13 (connected to the cathode electrode 15) are formed using a deposition, a photolithographic etching method or a lift-off method. Furthermore, the anode driver IC 31 and the cathode driver IC 32 are mounted to the substrate 10, and the anode wiring 12 and the cathode wiring 13 are respectively connected to the anode driver IC 31 and the cathode driver IC 32.

Next, the operation of the above configured LED backlight device 100 will be described.

First, when a lighting signal sent from a superior device (such as a not shown personal computer) is inputted to the anode driver IC 31, an amplifier circuit of the anode driver IC 31 applies a constant current to the anode electrode 14 of the LED 11 via the anode wiring 12. When the lighting signal is inputted to the cathode driver IC 32, the cathode driver IC 32 applies the current to flow therein from the cathode electrode 15 of the LED 11 via the cathode wiring 13, so that the LED 11 emits the light.

When the LED 11 emits near-ultraviolet rays or ultraviolet rays having the wavelength ranging from 300 to 450 nm as shown by the arrows A in FIG. 1, the phosphor 30 (facing the LED 11) is excited by the near-ultraviolet rays or ultraviolet rays, and the phosphor 30 emits white light as shown by the arrows B in FIG. 1. The LCD panel 102 provided in opposition to the LED backlight device 10 is illuminated by the light (emitted by the phosphor 30) from the backside of the LED panel 102.

In this regard, in order to prevent the oxidization or deterioration of the phosphor 30, it is possible to establish an inert gas atmosphere or to substantially form a vacuum in a space between the LED backlight device 100 and the LCD panel 102.

As described above, in the first embodiment, the LED 11, the anode wiring 12 and the cathode wiring 13 are formed on the substrate 10 having an optical transparency, and the LED 11 are connected to and the anode wirings 12 and the cathode wirings 13 using the semiconductor process, and therefore it becomes possible to accomplish a thinner LED backlight device 100.

Further, the LED element is known as an element having a high luminance and consuming less electric power, and has a record of performance. Using such a LED element as the light source, it becomes possible to obtain a luminance that can not be accomplished by the conventional light emitting device such as an organic EL (Electric Luminescence) element.

Second Embodiment

Next, the second embodiment of the present invention will be described. Components of the second embodiment that are the same as those of the first embodiment are assigned the same reference numerals, and the description thereof are omitted. Further, the description of the operations and advantages that are same as those of the first embodiment are omitted.

Figure 6:
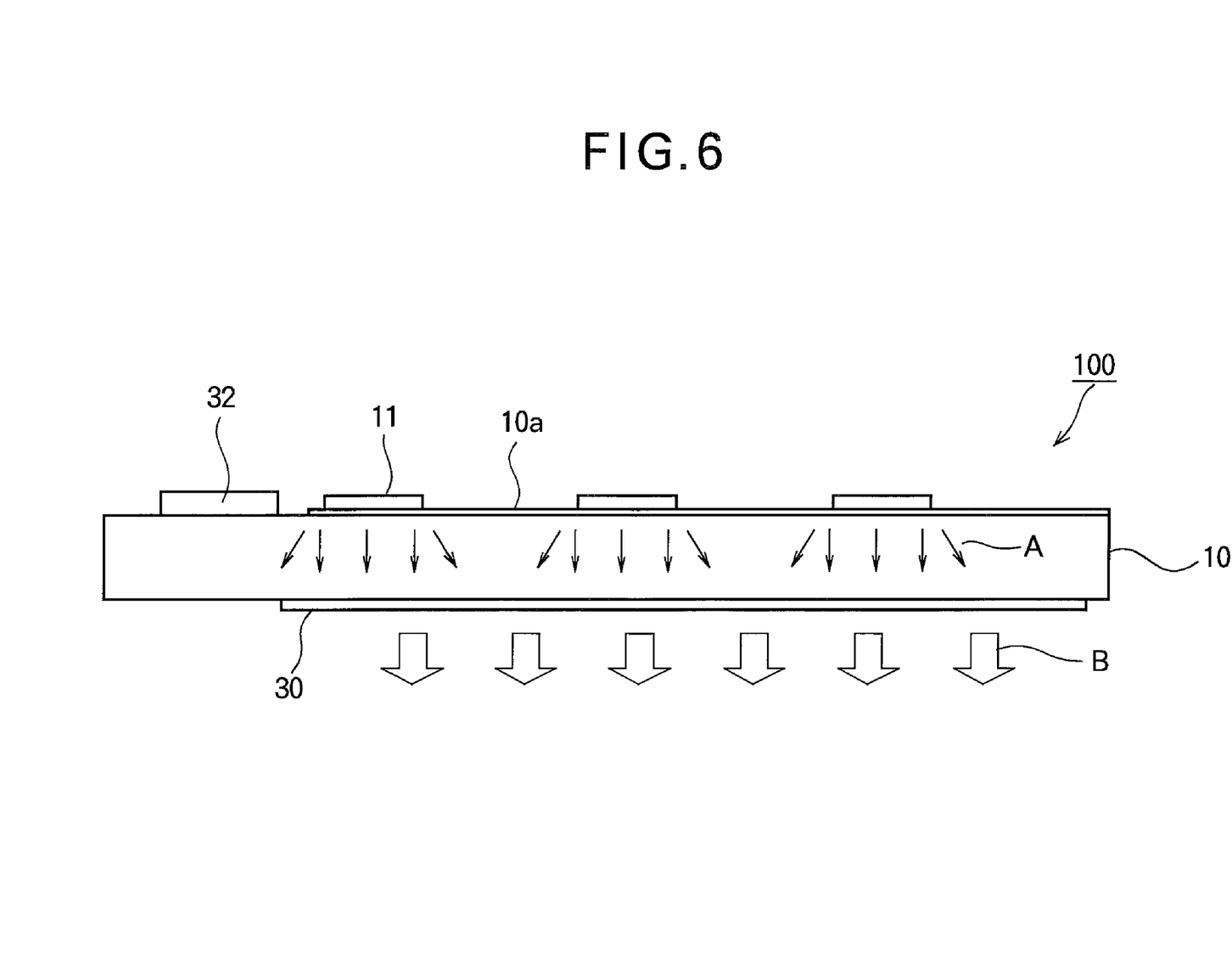
FIG. 6 is a side sectional view showing an LED backlight device according to the second embodiment of the present invention.
Figure 7:
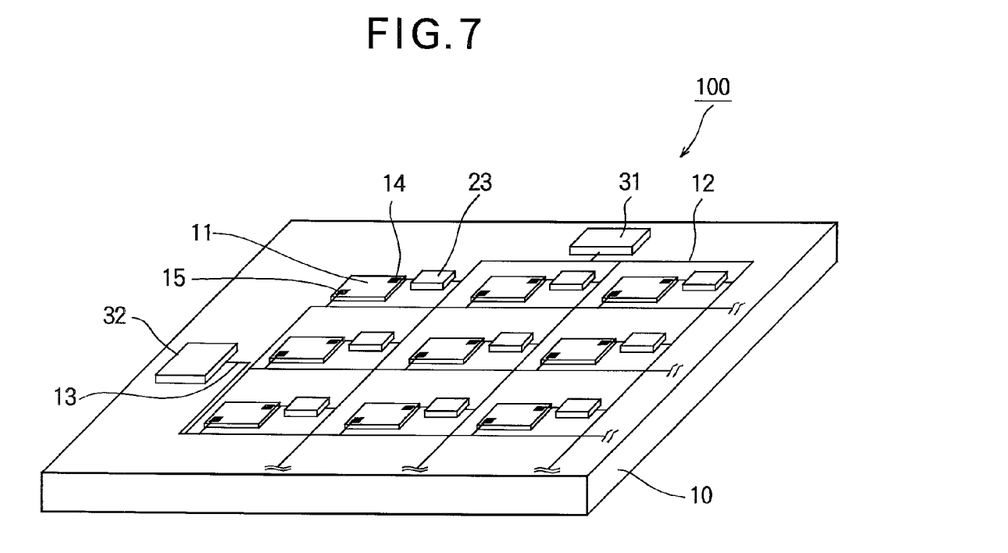
FIG. 7 is a perspective view showing the LED backlight device according to the second embodiment of the present invention, as seen from a first surface side.

FIG. 6 is a side sectional view showing the LED backlight device according to the second embodiment of the present invention. FIG. 7 is a perspective view showing the LED backlight device according to the second embodiment of the present invention, as seen from the first surface side.

In the second embodiment, the LED backlight device 100 has a plurality of LEDs 11. In this case, the LEDs 11 are arranged in rows and columns (to form an LED array) on the first surface of the substrate 10 as shown in FIG. 7.

Although the number of the LEDs 11 can be arbitrarily determined, the number of LEDs 11 is described to be 9 for convenience of illustration. Further, although the arranging manner of the LEDs 11 can be arbitrarily determined, the LEDs 11 are described to be arranged in a grid. To be more specific, in the example shown in FIG. 7, the LED array on the substrate 10 includes LEDs 11 arranged at equal intervals in a square grid and in a matrix with 3 rows and 3 columns.

The anode wiring 12 having an end connected to the anode driver IC 31 is branched into a plurality of branch lines (in this example, three branch lines). The respective branch lines extend along the respective columns and are connected to the anode electrodes 14 of the respective LEDs 11 of the respective columns. The anode electrodes 14 and the branch lines of the anode wiring 12 are connected via constant current elements 23. The constant current elements 23 are composed of electric resistances or the like, and are mounted to positions in the vicinities of the respective LEDs 11 on the substrate 10. The anode driver IC 31 has a switching circuit of a large capacity capable of supplying ON-voltage to all of the constant current elements 23 according to the lighting signals, and supplying current to all of the LEDs 11.

The cathode wiring 13 having an end connected to the cathode driver IC 32 is branched into a plurality of branch lines (in this example, three branch lines). The respective branch lines extend along the respective rows and are connected to the cathode electrodes 15 of the respective LEDs 11 of the respective rows. The cathode driver IC 32 has a switching circuit of a large capacity capable of allowing the current from all of the LEDs 11 to flow into the switching circuit.

In the example shown in FIGS. 6 and 7, the anode driver IC 31 and the cathode driver IC 32 are provided on the substrate 10. The anode driver IC 31 and the cathode driver IC 32 are not necessarily provided on the substrate 10, but can be provided on other print circuit board or the like.

Other components of the LED backlight device 100 of the second embodiment are the same as those of the first embodiment, and description thereof are omitted.

Next, a process for forming the LEDs 11 will be described.

Figure 8:
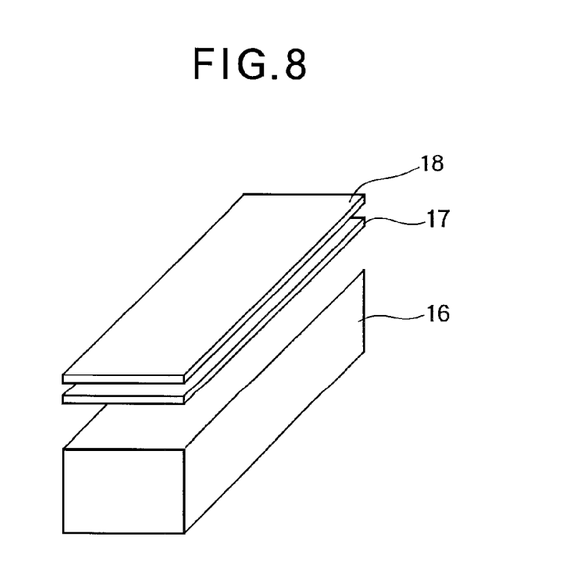
FIG. 8 is a schematic view showing a process for peeling an LED thin-film layered structure according to the second embodiment of the present invention.
Figure 9:
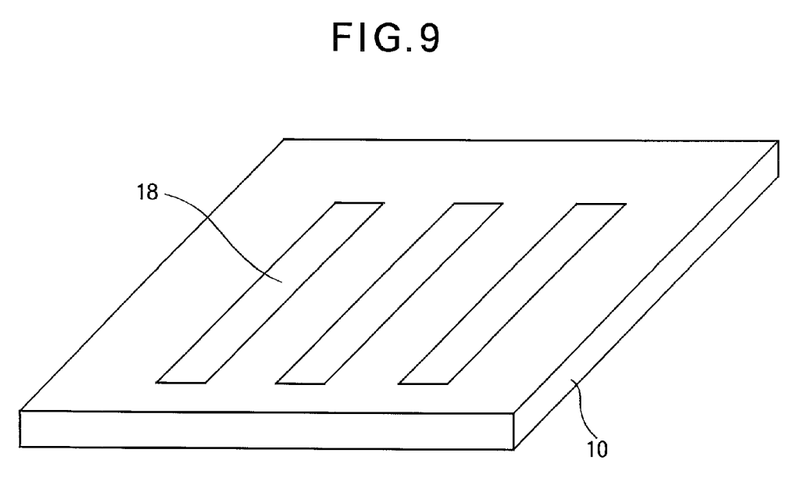
FIG. 9 is a schematic view showing a process for fixing the LED thin-film layered structure to a substrate according to the second embodiment of the present invention.
Figure 10:
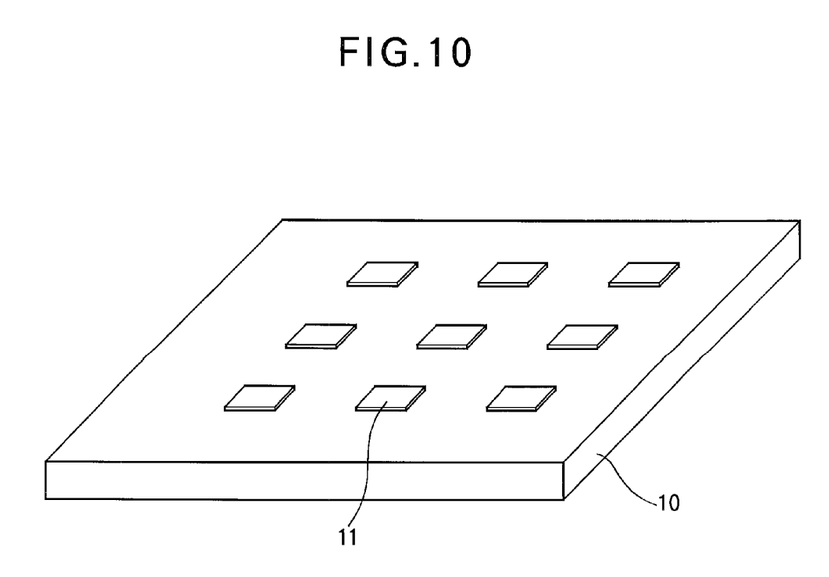
FIG. 10 is a schematic view showing a process for dividing the LED thin-film layered structure according to the second embodiment of the present invention.

FIG. 8 shows a process for peeling the thin-film layered structure (i.e., the LEDs 11) according to the second embodiment of the present invention. FIG. 9 shows a process for fixing the thin-film layered structure to the substrate 10 according to the second embodiment of the present invention. FIG. 10 shows a process for dividing the thin-film layered structure according to the second embodiment of the present invention.

In FIGS. 8 though 10, a thin-film layered structure 18 in the form of an elongated band or a strip is fixed to the substrate 10, and then divided into a plurality of LEDs 11 as described later. The thin-film layered structure 18 (i.e., the LEDs 11) emits near-ultraviolet rays or ultraviolet rays, and is formed of a thin-film layered structure having heterostructure or double-heterostructure composed of a plurality of layers such as gallium nitride or indium gallium nitride, aluminum gallium nitride or aluminum nitride and the like.

The numeral 17 indicates a sacrificial layer formed between the base material 16 and the thin-film layered structure 18 as was described in the first embodiment. The sacrificial layer 17 is composed of material such as, for example, aluminum arsenide that can easily be etched by an etching solution described later.

As was described in the first embodiment, the base material 16 is composed of, for example, gallium arsenide, gallium nitride or sapphire. The thin-film layered structure 18 of inorganic material layers (that becomes the LEDs 11) is epitaxially grown on the base material 16 using a vapor-phase growth method such as an MOCVD method.

Next, a process for peeling the epitaxially grown thin-film layered structure 18 from the base material 16 will be described.

If each LED 11 is designed to have, for example, a square shape having each side of 2 mm in length, the thin-film layered structure is formed into a strip shape having a width greater than or equal to 2 mm and a length greater than or equal to the length of a column of the LED array (i.e., a column including three LEDs 11). In this case, the thin-film layered structure 18 is formed in the strip shape on the base material 16 using the etching solution such as a solution containing phosphoric acid, hydrogen peroxide and water ($H_3PO_4:H_2O_2:H_2O$), by means of the photolithographic etching technique broadly used in the semiconductor manufacturing process.

Next, the base material 16 on which the thin-film layered structure 18 is formed is immersed in the etching solution such as hydrogen fluoride solution or hydrochloric solution or the like. With this, the sacrificial surface 17 is etched, and the thin-film layered structure 18 is peeled off from the base material 16.

Then, the thin-film layered structure 18 (having been peeled off from the base material 16) is pressed against the first surface of the substrate 10 having been planarized, and the substrate 10 and the thin-film layered structure 18 are fixed to and integrated with each other by means of intermolecular force such as hydrogen bonding.

The first surface of the substrate 10 is formed of the surface layer 10a having an optical transparency composed of an organic insulation film (such as polyimide film or the like) or an inorganic insulation film (such as silicon oxide film or the like). The surface layer 10a is preferably planarized to a surface accuracy less than or equal to several tens of nanometers, and has no concaves or convexes, as was described in the first embodiment. Since the surface of the substrate 10 is such a flat surface having no concave or convex, the bonding between the thin-film layered structure 18 and the substrate 10 by means of intermolecular force (such as hydrogen bonding) can be facilitated.

By repeating the above described processes, the thin-film layered structures 18 of a plurality of columns (for example, three columns) are fixed to and integrated with the first surface of the substrate 10.

Next, each thin-film layered structure 18 fixed to the first surface of the substrate 10 is divided into a plurality of parts to thereby form a plurality of LEDs 11 using a photolithographic etching method by means of an etching solution containing phosphoric acid and hydrogen peroxide and water ($H_3PO_4:H_2O_2:H_2O$). In this embodiment, each thin-film layered structure 18 is divided into three LEDs 11. With this, as shown in FIG. 10, the LED array including the LEDs 11 arranged at equal intervals in a square grid and in a matrix of 3 rows and 3 columns on the first surface of the substrate 10 can be obtained.

Subsequently, the anode electrode 14 and the cathode electrode 15 of the respective LEDs 11, and the anode wiring 12 (connected to the anode electrode 14) and the cathode wiring 13 (connected to the cathode electrode 15) are formed using a deposition, a photolithographic etching method or a lift-off method. In this regard, the anode electrode 14 and the cathode electrode 15 are metal electrodes composed of gold, aluminum, or layered metal electrodes composed of gold or aluminum layered with nickel, titan or the like. With this, the anode electrodes 14 of the respective LEDs 11 are connected to the anode driver IC 31 via the constant current elements 23 and the anode wiring 12, the cathode electrodes 15 of the respective LEDs 11 are connected to the cathode driver IC 32 via the cathode wiring 13.

Here, the description is made to the case where each strip-shaped thin-film layered structure 18 is divided into the square-shaped LEDs 11. However, the LED 11 can have any shape such as an elongated rectangle, a rhomboidal shape or the like.

Next, the operation of the above configured LED backlight device 100 of the second embodiment will be described.

First, when a lighting signal sent from a superior device (such as a not shown personal computer) is inputted to the anode driver IC 31, the amplifier circuit of the anode driver IC 31 applies ON voltage to all of the constant current elements 23 via the anode wiring 12, and apply current to all of the LEDs 11. When the lighting signal is inputted to the cathode driver IC 32, the switching circuit of the cathode driver IC 32 operates to allow the current to flow therein from the LEDs 11 via the cathode wiring 13. Therefore, current flows through all of the LEDs 11, so that the LEDs 11 emit the light.

When the respective LEDs 11 emit near-ultraviolet rays or ultraviolet rays having the wavelength ranging from 300 to 450 nm as shown by the arrows A in FIG. 6 according to the lighting signal, the phosphor 30 (facing the LEDs 11) is excited by the near-ultraviolet rays or ultraviolet rays, and the phosphor 30 emits white light as shown by the arrows B in FIG. 6.

As described above, in the second embodiment, a plurality of LEDs 11 are formed on the substrate 10 having an optical transparency, and therefore it becomes possible to accomplish a thinner LED backlight device 100 having a large surface area. Further, a plurality of the LEDs 11 can be formed to have desired sizes and shapes, and can be disposed on desired positions, and therefore the sizes, shapes and positions of the LEDs 11 can be adjusted so as to restrict the variation in luminance.

Third Embodiment

Next, the third embodiment of the present invention will be described. Components of the third embodiment that are the same as those of the first or second embodiment are assigned the same reference numerals, and the description thereof are omitted. Further, the description of the operations and advantages that are same as those of the first or second embodiment are omitted.

Figure 11:
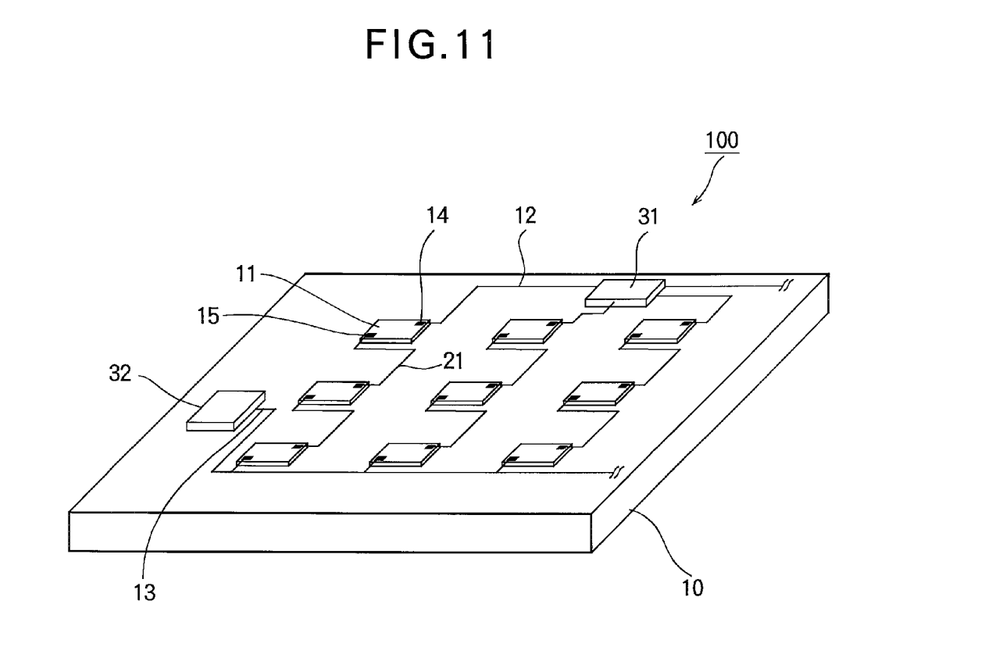
FIG. 11 is a perspective view showing an LED backlight device according to the third embodiment of the present invention, as seen from a first surface side.

FIG. 11 is a perspective view showing the LED backlight device according to the third embodiment of the present invention.

The third embodiment is different from the second embodiment in the wiring structure for connecting the anode driver IC 31 and the cathode driver IC 32 to the anode electrode 14 and the cathode electrode 15 of the respective LEDs 11. Further, the constant current elements 23 (FIG. 7) are not provided in the third embodiment.

The anode driver IC 31 is connected to an end of the anode wiring 12 connected to the anode electrode 14 of the LED 11 (i.e., the endmost LED 11) closest to the anode driver IC 31 of each column of the LEDs 11. The cathode driver IC 32 is connected to an end of the cathode wiring 13 connected to the cathode electrode 15 of the LED 11 (i.e., the endmost LED 11) farthest from the anode driver IC 31 of each column of the LEDs 11. Further, in each column, the anode electrodes 14 and the cathode electrodes 15 of the adjacent LEDs 11 are connected to each other by interconnection wirings 21. In other words, the LEDs 11 of each column are connected in series via the interconnection wirings 21. Further, the anode electrode 14 and the cathode electrode 15 of the endmost LEDs 11 of each column are respectively connected to the anode driver IC 31 and the cathode driver IC 32 via the anode wiring 12 and the cathode wiring 13.

The anode driver IC 31 has a function to apply current to the LEDs 11 according to the lighting signal. For example, a shift register circuit, a latch circuit, a constant current circuit, an amplifier circuit and the like are integrated in the anode driver IC 31. The cathode driver IC 32 has a switching circuit of a large capacity capable of allowing the current from all of the LEDs 11 to flow into the switching circuit.

Although the anode driver IC 31 and the cathode driver IC 32 are provided on the substrate 10 in the example shown in FIG. 11, the anode driver IC 31 and the cathode driver IC 32 are not necessarily provided on the substrate 10, but can be provided on other print circuit board (not shown) or the like.

Other components of the LED backlight device of the third embodiment are the same as those of the second embodiment, and therefore description thereof are omitted.

Next, the operation of the above configured LED backlight device 100 of the third embodiment will be described.

First, when a lighting signal sent from a superior device (such as a not shown personal computer) is inputted to the anode driver IC 31, the amplifier circuit of the anode driver IC 31 applies constant current to the anode electrode 14 of the LED 11 closest to the anode driver IC 31 of each column of the LEDs 11 via the anode wiring 12. When the lighting signal is inputted to the cathode driver IC 32, the cathode driver IC 32 operates to allow the current to flow into the cathode driver IC 32 from the cathode electrode 15 of the LED 11 farthest from the anode driver IC 31 of each column of the LEDs 11 via the cathode wiring 13 connected to the cathode driver IC 32 by the switching circuit of a large capacity. Therefore, current flows through the LEDs 11 connected by the interconnection wirings 21 in series in each column, so that the respective LEDs 11 emit the light.

When the respective LEDs 11 emit near-ultraviolet rays or ultraviolet rays having the wavelength ranging from 300 to 450 nm according to the lighting signal, the phosphor 30 (facing the LEDs 11) is excited by the near-ultraviolet rays or ultraviolet rays, and the phosphor 30 emits white light.

As described above, in the third embodiment, a plurality of LEDs 11 are formed on the substrate 10 having an optical transparency, and therefore it becomes possible to accomplish a thinner LED backlight device 100 having a large surface area. Further, since the LEDs 11 of each column are connected in series, the current (the amount of which is the same as the case where the constant current elements are provided) can be applied to the respective LEDs 11 without using constant current elements. Therefore, the configuration of the LED backlight device 100 can be simplified, and the cost can be reduced.

In the third embodiment, the description is made to the case where the LEDs 11 of each column are connected in series. However, it is also possible to connect the LEDs 11 of each row in series, or to connect the obliquely arranged LEDs 11.

Fourth Embodiment

Next, the fourth embodiment of the present invention will be described. Components of the fourth embodiment that are the same as those of the first, second or third embodiment are assigned the same reference numerals, and the description thereof are omitted. Further, the description of the operations and advantages that are same as those of the first, second or third embodiment are omitted.

Figure 12:
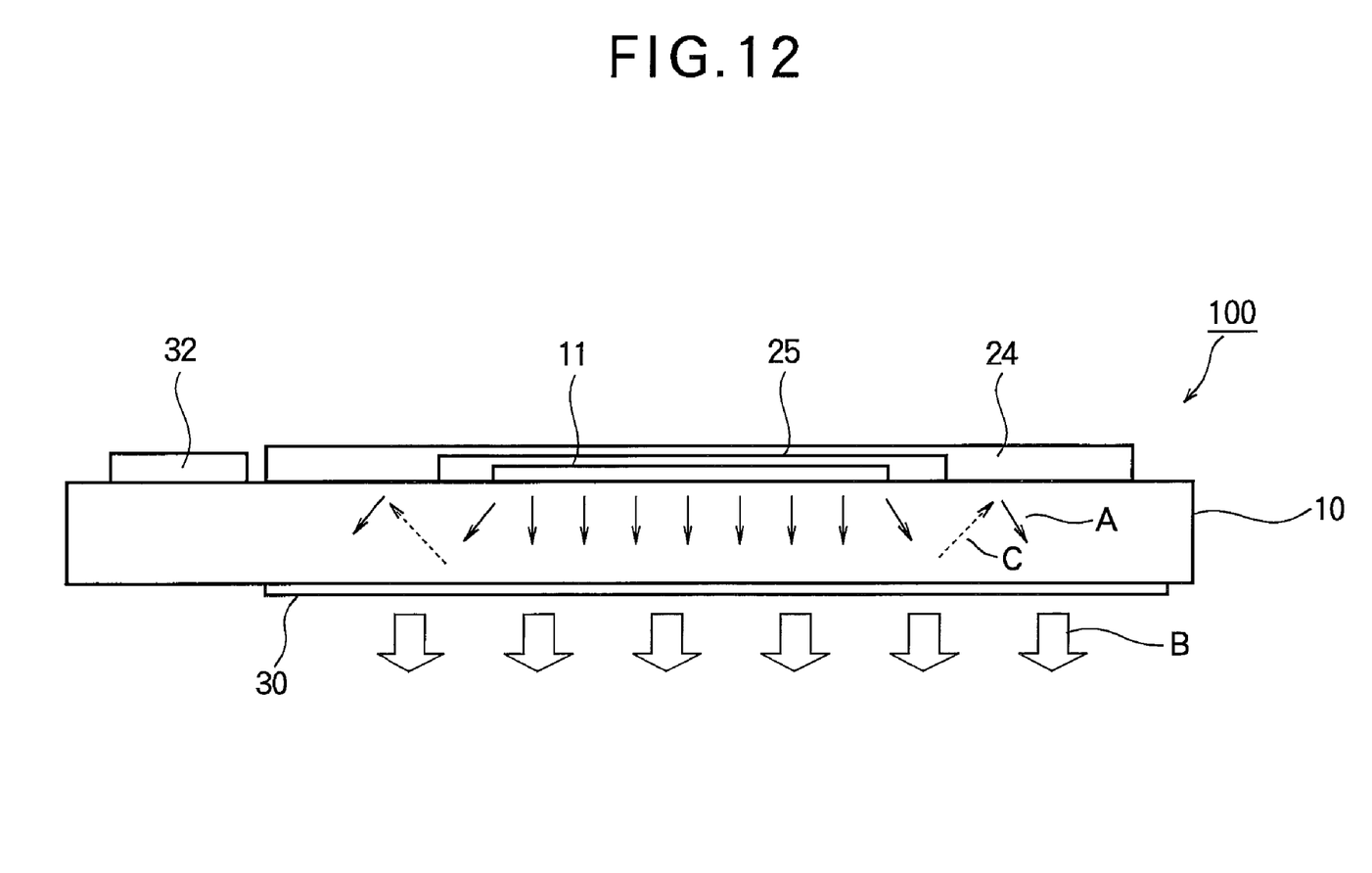
FIG. 12 is a side sectional view showing an LED backlight device according to the fourth embodiment of the present invention.

FIG. 12 is a side sectional view showing the LED backlight device according to the fourth embodiment of the present invention.

In the fourth embodiment, the backlight device 100 includes a reflection film 24. The reflection film 24 reflects near-ultraviolet rays or ultraviolet rays emitted by the LED 11. To be more specific, a protection film 25 is formed to entirely cover the LED 11 on the first surface of the substrate 10, and the reflection film 24 is formed to cover the protection film 25. The reflection film 24 reflects near-ultraviolet rays and ultraviolet rays emitted in the direction opposite to the substrate 10 from the LED 11, and also reflects near-ultraviolet rays and ultraviolet rays having been reflected by the phosphor 30 or having been reflected at a boundary surface between the phosphor 30 and the substrate 10 as shown by arrows C in FIG. 12.

In the fourth embodiment, the LED 11 is peeled off from the base material 16 as was described in the first embodiment, and is pressed against the first surface of the substrate 10, so that the LED 11 is fixed to the first surface of the substrate 10 by means of intermolecular force such as hydrogen bonding. With this, the LED 11 is integrated with the substrate 10. Although not shown in FIG. 12, the surface layer 10a can be formed on the substrate 10 as was described in the first embodiment.

Subsequently, connecting portions of the anode electrode 14 and the cathode electrode 15 are formed on the LED 11 (having been integrated with the substrate 10) using, for example, a photolithographic etching method by means of an etching solution containing phosphoric acid and hydrogen peroxide and water ($H_3PO_4$:$H_2O_2$:$H_2O$). Further, the anode electrode 14 and the cathode electrode 15, and the anode wiring 12 (connected to the anode electrode 14) and the cathode wiring 13 (connected to the cathode electrode 15) are formed using a deposition, a photolithographic etching method or a lift-off method. Furthermore, the anode driver IC 31 and the cathode driver IC 32 are mounted to the substrate 10, and the anode wiring 12 and the cathode wiring 13 are respectively connected to the anode driver IC 31 and the cathode driver IC 32.

Next, the protection film 25 is formed to entirely cover the LED 11. The protection film 25 is composed of an organic insulation film such as a polyimide film or the like or an inorganic insulation film such as a silicon oxide film or the like. Further, the reflection film 24 is formed to entire cover the protection film 25. The reflection film 24 is formed by forming a metal film composed of gold, aluminum, or a layered metal film composed of gold or aluminum layered with nickel, titan or the like on the surface of the substrate 10 to cover the protection film 25, and patterning the metal film.

Other components of the LED backlight device 100 are the same as those of the first embodiment, and therefore description thereof are omitted.

Next, the operation of the above configured LED backlight device 100 of the fourth embodiment will be described.

First, when a lighting signal sent from a superior device (such as a not shown personal computer) is inputted to the anode driver IC 31, an amplifier circuit of the anode driver IC 31 applies a constant current to the anode electrode 14 of the LED 11 via the anode wiring 12. When the lighting signal is inputted to the cathode driver IC 32, the cathode driver IC 32 allows the current to flow therein from the cathode electrode 15 of the LED 11 via the cathode wiring 13, so that the LED 11 emits the light.

When the LED 11 emits near-ultraviolet rays or ultraviolet rays having the wavelength ranging from 300 to 450 nm as shown by the arrows A in FIG. 12, the phosphor 30 (facing the LED 11) is excited by the near-ultraviolet rays or ultraviolet rays, and the phosphor 30 emits white light as shown by the arrows B in FIG. 12.

Further, the near-ultraviolet rays or ultraviolet rays emitted by the LED 11 in the direction opposite to the substrate 10, and the near-ultraviolet rays or ultraviolet rays reflected by the phosphor 30 or reflected at the boundary surface between the phosphor 30 and the substrate 10 are further reflected by the reflection film 24, and are incident on the phosphor 30. Therefore, the phosphor 30 is also exited by the near-ultraviolet rays or ultraviolet rays (reflected by the reflection film 24) to emit white light.

As described above, in the forth embodiment, the reflection film 24 is provided on the LED 11 formed on the first surface of the substrate 10, and therefore it is possible to provide a thinner LED backlight device 100 providing a high intensity.

In the fourth embodiment, the description is made to the LED backlight device having the single LED 11. However, the fourth embodiment (i.e., the reflection film 24 and the protection film 25) is applicable to the LED backlight device having a plurality of LEDs 11 as was described in the second and third embodiments. In this case, it becomes possible to provide the thinner LED backlight device 100 providing a high intensity and having a large surface area.

While the preferred embodiments of the present invention have been illustrated in detail, it should be apparent that modifications and improvements may be made to the invention without departing from the spirit and scope of the invention as described in the following claims.

What is claimed is:

1. An LED backlight device comprising:
   a substrate having an optical transparency and having a first surface and a second surface opposite to said first surface;
   an LED thin-film layered structure fixed to said first surface of said substrate, said LED thin-film layered structure being formed of epitaxially grown inorganic material layers as a P-N junction device;
   an anode electrode and a cathode electrode formed on said LED thin-film layered structure;
   an anode driver IC and a cathode driver IC for driving said LED thin-film layered structure;
   a wiring structure that electrically connects said anode driver IC and said anode electrode of said LED thin-film layered structure and electrically connects said cathode driver IC and said cathode electrode of said LED thin-film layered structure, and
   a phosphor formed on said second surface of said substrate.

2. The LED backlight device according to claim 1, wherein said wiring structure comprises:
   an anode wiring formed on said first surface of said substrate for connecting said anode driver IC and said anode electrode of said LED thin-film layered structure, and
   a cathode wiring formed on said first surface of said substrate for connecting said cathode driver IC and said cathode electrode of said LED thin-film layered structure.

3. The LED backlight device according to claim 1, wherein said LED thin-film layered structure is fixed to said first surface of said substrate by means of intermolecular force, and emits near-ultraviolet rays or ultraviolet rays having the wavelength ranging from 300 nm to 450 nm.

4. The LED backlight device according to claim 1, wherein said phosphor is formed by mixing a phosphor that emits red light having the wavelength ranging from 620 nm to 710 nm when exposed to light having the wavelength ranging from 300 nm to 450 nm, a phosphor that emits green light having the wavelength ranging from 500 nm to 580 nm when exposed to light having the wavelength ranging from 300 nm to 450 nm, a phosphor that emits blue light having the wavelength ranging from 450 nm to 500 nm when exposed to light having the wavelength ranging from 300 nm to 450 nm, and by coating a resultant mixed material.

5. The LED backlight device according to claim 1, wherein said LED thin-film layered structure is formed by epitaxially growing inorganic material layers as a p-n junction device on a sacrificial layer on a base material different from said substrate, peeling said inorganic material layers from said base material by removing said sacrificial layer using etching, and fixing said inorganic material layers to said substrate by means of intermolecular force.

6. The LED backlight device according to claim 1, wherein said first surface of said substrate is formed of an organic insulation film or an inorganic insulation film, and is planarized.

7. The LED backlight device according to claim 1, wherein a plurality of said LED thin-film layered structures are fixed to said first surface of said substrate, said LED thin-film layered structures being disposed at intervals in rows and columns on said first surface,
   wherein a plurality of said anode electrodes and a plurality of said cathode electrodes are formed respectively on said LED thin-film layered structures.

8. The LED backlight device according to claim 7, wherein said wiring structure comprises an anode wiring and a cathode wiring respectively formed on said first surface of said substrate,
   wherein said anode wiring connects said anode driver IC and said anode electrodes of said LED thin-film layered structures, and
   wherein said cathode wiring connects said cathode driver IC and said cathode electrodes of said LED thin-film layered structures.

9. The LED backlight device according to claim 7, wherein said wiring structure comprises an anode wiring, a cathode wiring and an interconnection wiring respectively formed on said first surface of said substrate,
   wherein said anode wiring connects said anode driver IC and said anode electrode of an endmost LED thin-film layered structure of each column or row of said LED thin-film layered structures,
   wherein said cathode wiring connects said cathode driver IC and said cathode electrode of an endmost LED thin-film layered structure of each column or row of said LED thin-film layered structures, and
   wherein said interconnection wiring connects said LED thin-film layered structures of each column or row in series.

10. The LED backlight device according to claim 7, wherein said LED thin-film layered structures are formed by epitaxially growing inorganic material layers as a p-n junction device on a sacrificial layer on a base material different from said substrate, peeling said inorganic material layers from said base material by removing said sacrificial layer using etching, fixing said inorganic material layers to said substrate by means of intermolecular force, and dividing said inorganic material layers into said plurality of LED thin-film layered structures using etching.

11. The LED backlight device according to claim 7, further comprising:
   a protection film formed to cover said LED thin-film layered structure fixed to said first surface of said substrate, and
   a reflection film formed to cover said protection film so that said reflection film faces said phosphor.

12. An LCD device comprising said LED backlight device according to claim 1 and an LCD panel.

* * * * *